(12) United States Patent
Tomes et al.

(10) Patent No.: US 11,214,377 B2
(45) Date of Patent: Jan. 4, 2022

(54) MOUNT ARRANGEMENT FOR TORQUE ROLL VIBRATION ISOLATION

(71) Applicant: PRATT & WHITNEY CANADA CORP., Longueuil (CA)

(72) Inventors: Nathan Tomes, Toronto (CA); David Gagnon-Martin, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 438 days.

(21) Appl. No.: 16/415,308

(22) Filed: May 17, 2019

(65) Prior Publication Data
US 2020/0361616 A1 Nov. 19, 2020

(51) Int. Cl.
*B64D 27/26* (2006.01)
*B64F 5/10* (2017.01)
*B64D 27/12* (2006.01)

(52) U.S. Cl.
CPC ............. *B64D 27/26* (2013.01); *B64D 27/12* (2013.01); *B64F 5/10* (2017.01)

(58) Field of Classification Search
CPC ........ B64D 27/26; B64D 27/10; B64D 27/12; B64D 2027/262; B64D 2027/268
See application file for complete search history.

(56) References Cited

U.S. PATENT DOCUMENTS

| 2,175,999 | A | 10/1939 | Taylor |
| 5,443,229 | A | 8/1995 | O'Brien et al. |
| 5,746,391 | A | 5/1998 | Rodgers et al. |
| 6,328,293 | B1 * | 12/2001 | Olsen ............... B64D 27/18 267/140.11 |
| 8,444,085 | B2 | 5/2013 | Stretton et al. |
| 2003/0010866 | A1 | 1/2003 | Wilksch |
| 2019/0009918 | A1 | 1/2019 | Zameroski et al. |

FOREIGN PATENT DOCUMENTS

EP 1866203 A2 12/2007

OTHER PUBLICATIONS

European Search Report issued in counterpart EP application No. 20175282.1 dated Oct. 15, 2020.

* cited by examiner

*Primary Examiner* — Timothy D Collins
*Assistant Examiner* — Eric Acosta
(74) *Attorney, Agent, or Firm* — Norton Rose Fulbright Canada LLP

(57) ABSTRACT

A mounting arrangement for mounting a rotary engine to an aircraft structure, wherein the engine has a three orthogonal axes comprising: a roll axis; a pitch axis; and a yaw axis. The mounting arrangement comprises: one-degree-of-freedom links with reaction axes passing through the roll axis. A separate roll constraint has a moment reaction about the roll axis to decouple the torque roll mode from the other one-degree-of-freedom links.

16 Claims, 5 Drawing Sheets

MOUNT ARRANGEMENT FOR TORQUE ROLL VIBRATION ISOLATION

TECHNICAL FIELD

The disclosure relates to aircraft engines and, more particularly, to a rotary engine mounting arrangement.

BACKGROUND

Rotary engines generate significant alternating axial torque forces due to the nature of the combustion process. A low stiffness engine mount is desirable to limit the torque forces and vibration transmitted to the aircraft structure due to the alternating axial torque. However, a high mount stiffness is desirable in many engine installations, due to maximum allowable deflection limitations (ex. maximum shaft misalignments for turboshaft engines) on the translational and rotational deflection of an engine under high gravity loadings.

There is an inherent compromise in designing engine mounting arrangements which require high mount stiffness for limiting engine deflection during operation while low mount stiffness is required to limit torque and vibration. Improvement is desirable.

SUMMARY

In one aspect, the disclosure describes an aircraft engine assembly comprising: a rotary engine having a roll axis, a pitch axis and a yaw axis extending through a center of gravity of the rotary engine, a first set of one-degree-of-freedom links mounted to a first side and a second side of the rotary engine, the first set of one-degree-of-freedom links having a distal end configured to be mounted to an aircraft and a proximal end mounted to the rotary engine, the first set of one-degree-of-freedom links positioned relative to the rotary engine to have respective reaction axes passing through the roll axis; and a second set of links having a distal end configured to be mounted to the aircraft and a proximal end mounted to the rotary engine, the second set of links positioned relative to the rotary engine to have respective reaction axes transversally spaced-apart from the roll axis.

In accordance with another general aspect, there is provided a mounting arrangement for mounting a rotary engine to an aircraft structure, wherein the engine has three orthogonal axes comprising: a roll axis through an engine center of gravity; a pitch axis; and a yaw axis, the mounting arrangement comprising: a plurality of one-degree-of-freedom links mounted on each side of the rotary engine and having a distal end configured to be mounted to the aircraft structure and a proximal end configured to be mounted to the rotary engine, the plurality of one-degree-of-freedom links having respective reaction axes passing through the roll axis; and a roll constraint having a moment reaction about the roll axis.

In a further aspect, the disclosure describes a method of mounting a rotary engine to an aircraft structure, wherein the engine has a three orthogonal axes comprising: a roll axis through an engine center of gravity; a pitch axis; and a yaw axis, the method of mounting comprising: mounting a forward portion of the engine to the aircraft structure with an opposing pair of non-parallel one-degree-of-freedom forward links having a reaction axis passing through the roll axis; mounting a rearward portion of the engine to the aircraft structure with an opposing pair of non-parallel one-degree-of-freedom rearward links having a reaction axis passing through the roll axis; axially constraining the engine with an axial constraint having a reaction axis parallel to the roll axis; and rotationally constraining the engine with a roll constraint having a moment reaction about the roll axis; wherein the forward links, rearward links and axial constraint have a first mounting stiffness, and the roll constraint has a second mounting stiffness, wherein the second mounting stiffness is less than the first mounting stiffness.

In a further aspect, the disclosure describes an aircraft mount for a rotary engine comprising: an opposing pair of non-parallel one-degree-of-freedom forward links attached to a forward portion and an opposing pair of non-parallel one-degree-of-freedom rearward links attached to a rearward portion of the engine, the forward and rearward links having reactions passing through a torque roll axis; and an A-frame link on each central side of the engine oriented with a reaction transversely spaced apart from the torque roll axis, the reaction being non-parallel to the torque roll axis and configured to restrain axial and roll movement; wherein the roll movement is restrained with a roll constraint of roll stiffness lower than an axial stiffness of an axial constraint and lower than a link stiffness of the non-parallel one-degree-of-freedom links. Embodiments can include combinations of the above features.

Further details of these and other aspects of the subject matter of this application will be apparent from the detailed description included below and the drawings.

DETAILED DESCRIPTION

Figure 1:
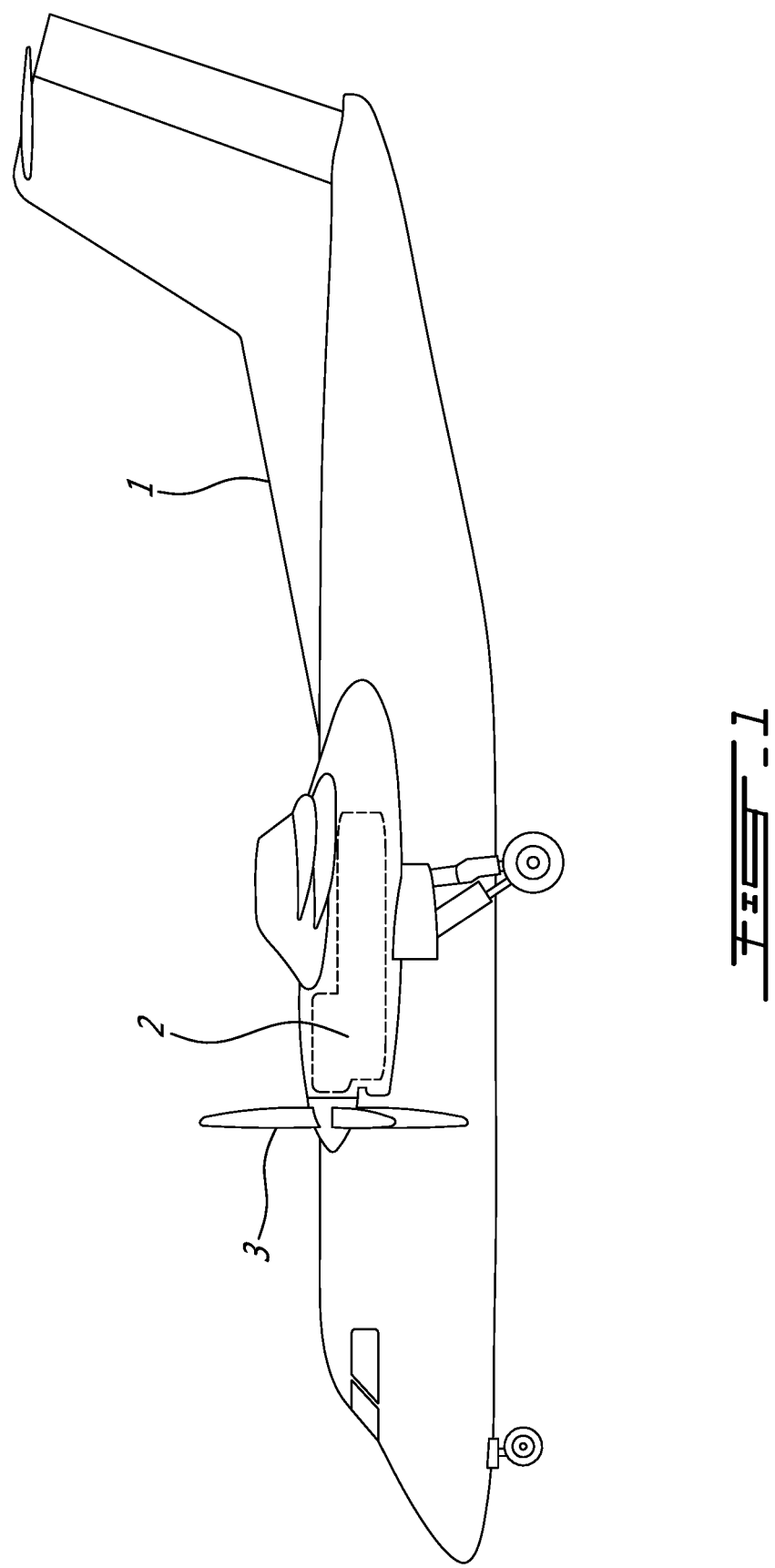
FIG. 1 shows a side view of an example aircraft with propellers driven by a wing mounted rotary engine.

FIG. 1 shows an example aircraft 1 with a rotary engine 2 driving a propeller 3. The present description relates to the mounting arrangement for mounting such a rotary engine 2 to the aircraft structure using struts or links. While FIG. 1 illustrates an airplane, it is understood that the mounting arrangement could also be used for helicopter installations. For instance, the mounting arrangement could be used to mount a compounded turboshaft engine including at least one rotary engine (e.g. A Wankel engine) compounding power with a turbine, to the structure of a helicopter.

Figure 2:
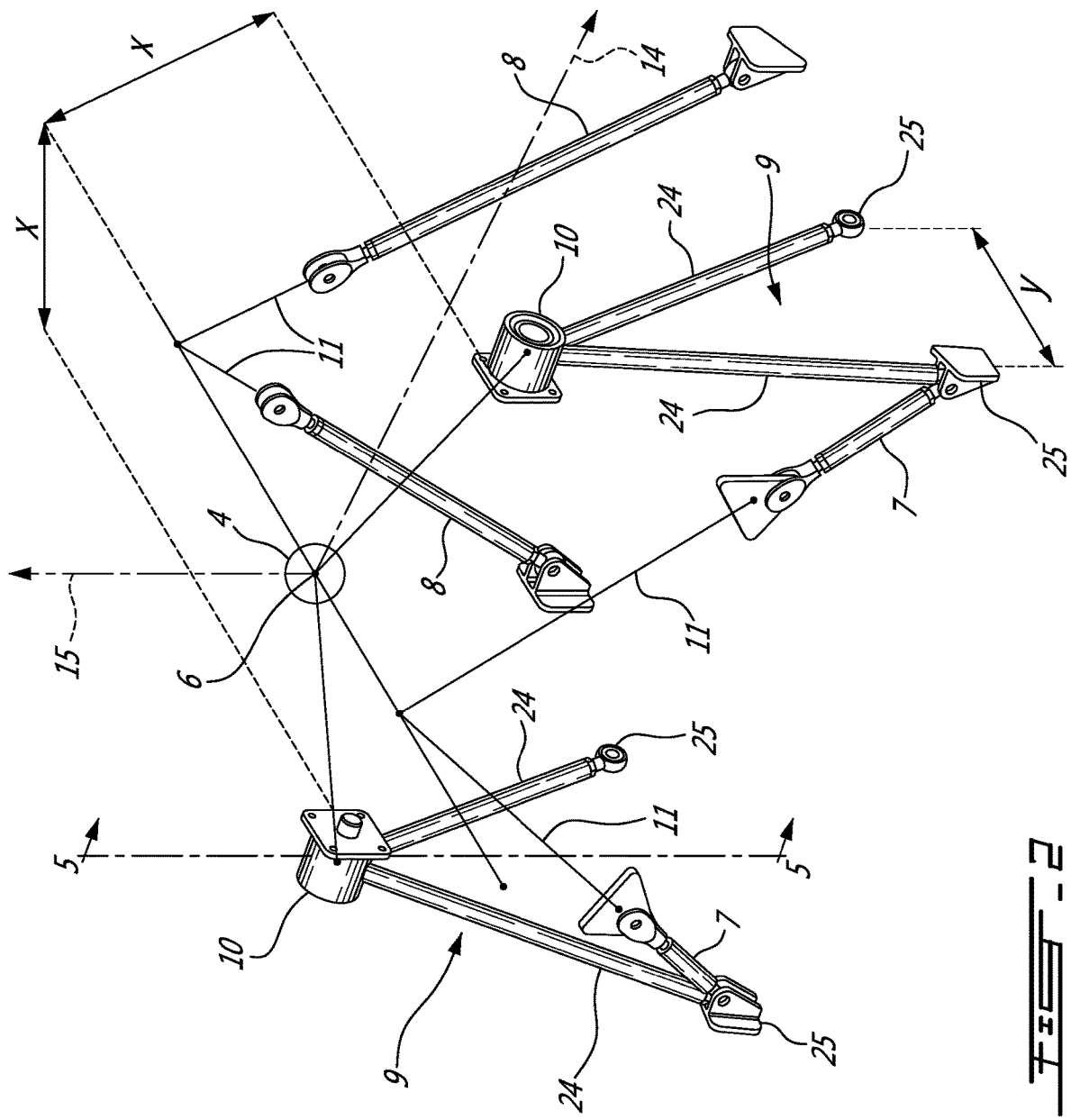
FIG. 2 is an isometric schematic view of a first mounting arrangement where the engine mass is depicted as a sphere having a roll axis and being supported by two forward links, two rearward links and two middle A-frame links.

FIG. 2 shows an isometric schematic view of a first mounting arrangement where the engine mass is depicted for clarity as a sphere 4 having a roll axis 5, a yaw axis 15 and a pitch axis 14 extending through the center of gravity 6 of the sphere 4. The rotary engine 2 mass depicted as a sphere 4 is supported on the aircraft structure by a front mount, a rear mount and an intermediate mount.

The front mount includes two non-parallel one-degree-of-freedom (1DOF) links 7 attached to either side of the engine 2 at a same axial station. Likewise, the rear mount includes two non-parallel 1DOF links 8 attached to either side of the engine 2 at a same axial station.

The forward links 7 and rearward links 8 are arranged with their reaction vectors 11 directed through the roll axis 5. Accordingly, the forward and rearward links 7, 8 do not constrain roll rotation about the roll axis 5 and do not constrain axial translation parallel to the roll axis 5. The forward and rearward links 7, 8 do constrain pitch rotation and yaw rotation. The forward and rearward links 7, 8 also constrain translation parallel to the pitch and yaw axes 14,15 (they resist vertical and lateral movements). The forward and rearward links 7, 8 have a high stiffness to restrict deflection of the engine.

In the example illustrated in FIG. 2, the intermediate mount includes a pair of A-frames 9 on each side of the engine 2 at a same axial station. Each A-frame 9 has a trunnion 10 at its apex. The A-frames 9 restrain axial translation parallel to the roll axis 5 as well as translation along the yaw axis 15. The stiffness at each of these engine interfaces can be controlled using elastomeric isolators so that the stiffness along the yaw axis 15 is low and the axial stiffness along roll axis 5 is high. The A-frames 9 also constrain rotation about the roll axis 5. The trunnion 10 exerts a moment force to constrain roll rotation since the trunnions 10 are disposed a distance "x" from the roll axis 5.

It can be appreciated that lateral rigid body motion along the pitch axis 14 is restricted by the forward and rearward links 7, 8. Axial rigid body motion along the roll axis 5 is restricted by axial reactions of the intermediate A-frames 9. Vertical rigid body motion along yaw axis 15 is restricted by all links 7, 8 and 9, but is dominated by the stiffer forward and rearward links 7, 8. Rotation along the roll axis 5 is only resisted by vertical reactions of the 2 intermediate mount A-frames 9. Rotation about the pitch axis 14 is predominantly resisted by the forward and rearward mount planes. Rotation about the yaw axis 15 is resisted at all mounts. This exemplary mount system contains a single DOF redundancy in that the system continues to restrict all degrees of freedom with any single link failed.

The embodiment shown in FIG. 2 can be described as 8 1DOF links arranged in a 1-1-2-2-1-1 configuration in order to decouple the torque roll mode from other degrees of freedom. This allows the stiffness in the alternating torque direction to remain low while restricting other degrees of freedom in a stiff manner. The result is low vibratory force transmission through the mounts while maintaining low deflections under high g loading. This arrangement can be used on any engine with high alternating torques which requires low vibratory force transmission and low deflection under g loading.

Figure 3:
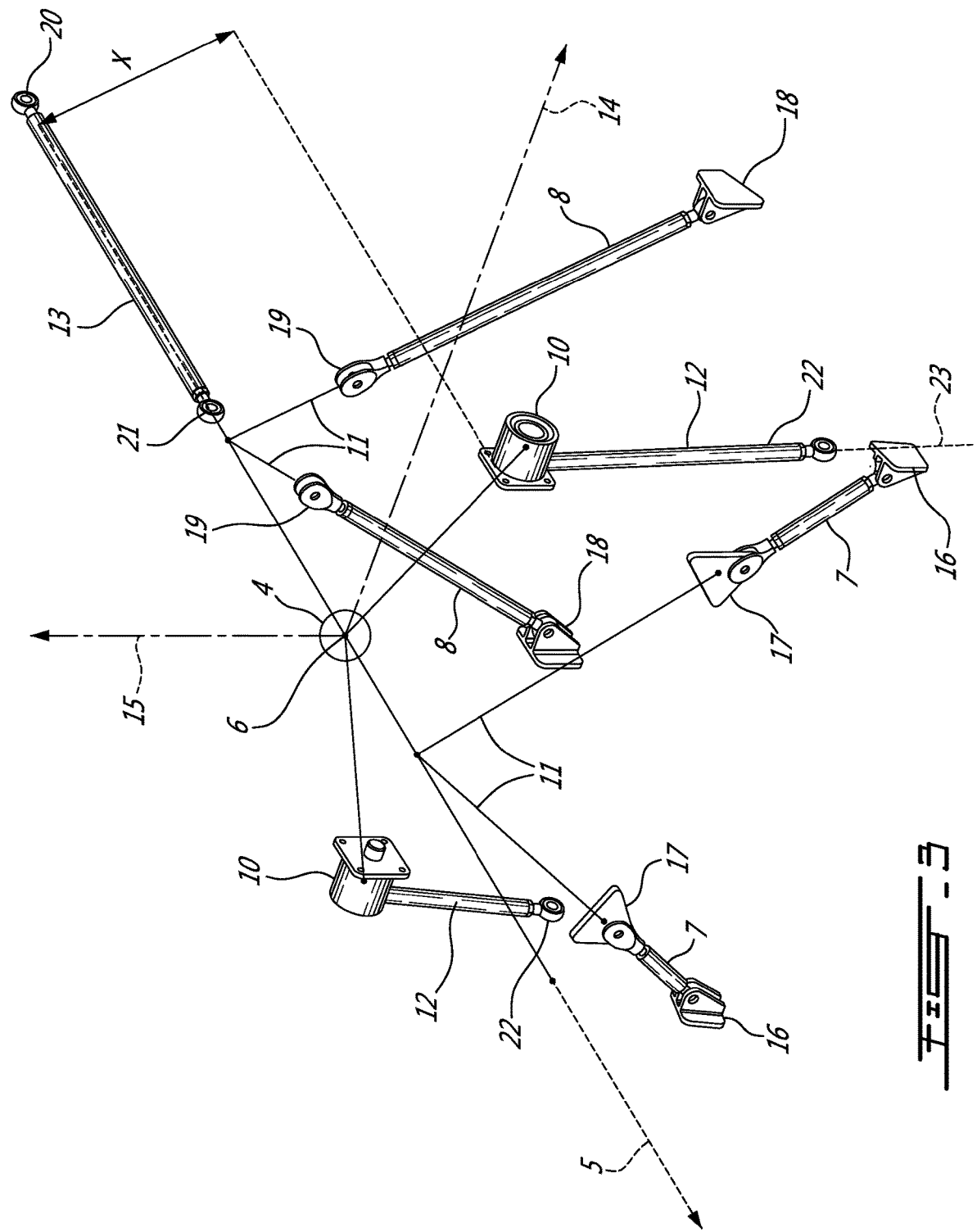
FIG. 3 is a like isometric schematic view of a second mounting arrangement where the engine is supported by two forward links, two rearward links, two central roll constraint links and a rear axial constraint link.

FIG. 3 shows a second example mounting arrangement where the trunnion 10 is supported by a roll link 12. Axial translation is constrained by the axial link 13. By isolating the roll constraint from the other constraints, the mounting arrangement permits use of a relatively high mounting stiffness to restrict deflection of the engine and a relatively low mounting stiffness to restrict roll rotation about the roll axis 5. For example, elastomeric bushings of the required low mounting stiffness can be used in the trunnions 10 whereas elastomeric bushings of the required high mounting stiffness can be used in the connection of the links 7, 8 and 13.

Figure 4:
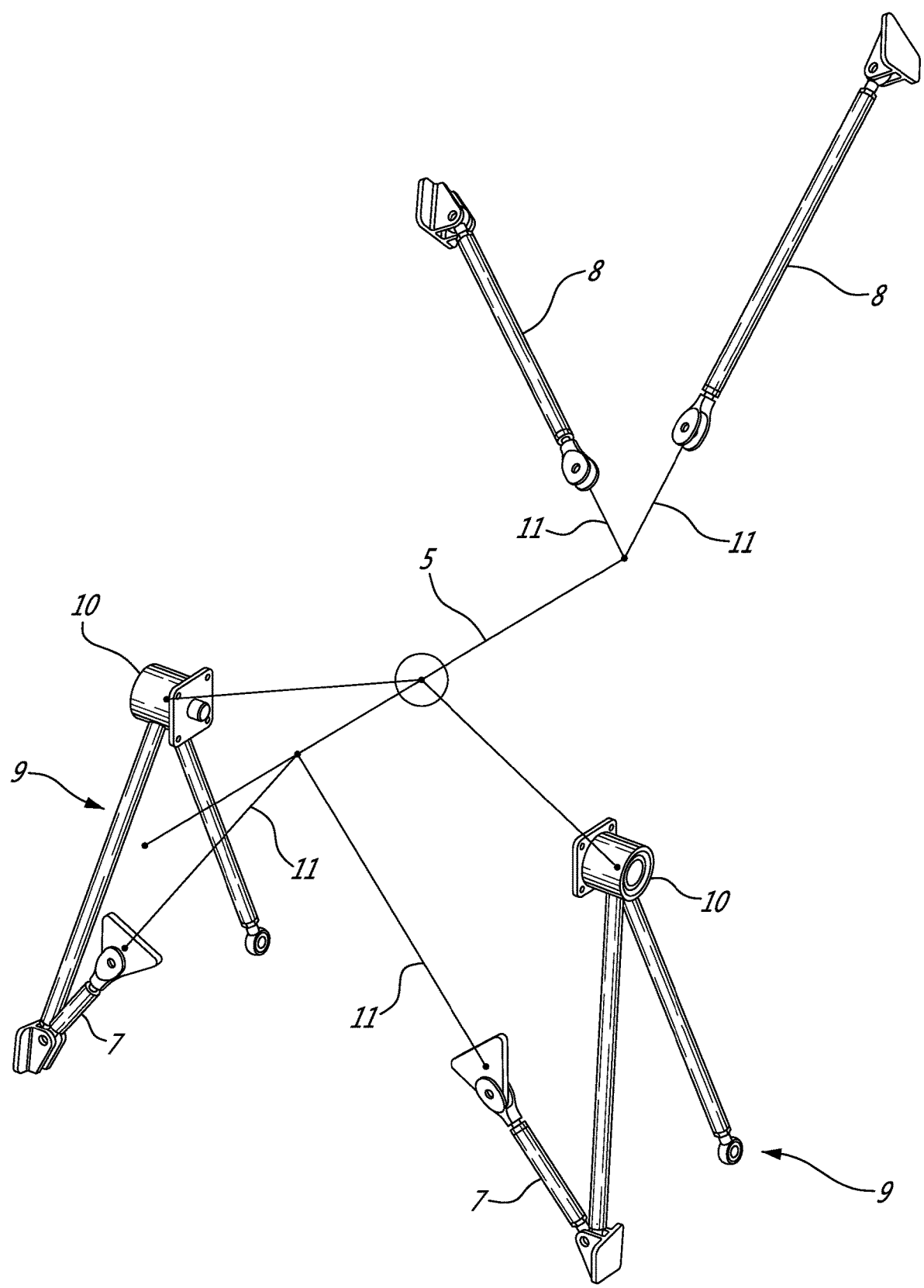
FIG. 4 is a like isometric schematic view of a third mounting arrangement where compared to FIG. 2 the two rearward links have been rotated 180 degrees about the roll axis.

FIG. 4 shows a third mounting arrangement where the two rearward links 8 have been rotated 180 degrees about the roll axis 5. The links 7, 8 can be rotated in a mounting plane about the roll axis 5 provided that their reactions 11 remain passing through the roll axis 5 which enables the engine to be mounted from below, from above or from one side.

In at least some of the arrangements, the low mounting stiffness for roll constraint remains decoupled from the other constraints having high mounting stiffness. In this manner, the tendency of the rotary engine to exert alternating roll torque forces on the supporting aircraft structure can be isolated with a low mounting stiffness bushing while high mounting stiffness restraints can be provided to limit deflection, pitch rotation and yaw rotation. Isolation is achieved by positioning the resonant frequency well below the excitation frequency, in a particular case by using a low stiffness in the torque roll axis. The mounting arrangement can be used on a rotary engine with high alternating roll torque forces which require low vibratory force transmission while retaining low deflection under g loading in flight. Further if any single link fails, the mounting arrangement continues to restrict all degrees of freedom providing a redundancy.

Referring back to FIG. 3, an example mounting arrangement is shown where restriction of roll rotation and axial translation are clearly separated. Accordingly, the roll restraint (roll link 12 and trunnion 10) can provide a low stiffness independent of the high stiffness restraints of axial translation, pitch rotation, yaw rotation and linear translation in all directions.

FIG. 3 shows mounting arrangement for mounting the rotary engine 2 to the aircraft structure 1 with links 7, 8, 12 and 13 having one degree-of-freedom. Once again, the engine is represented in the schematic views as a sphere 4 with a center of gravity 6 through which the roll axis 5 passes. The engine mass has a three orthogonal axes all passing through the engine center of gravity 6 namely: a roll axis 5; a pitch axis 14; and a yaw axis 15.

A forward constraint is arranged in a plane orthogonal to the roll axis 5. The forward constraint includes two non-parallel one-degree-of-freedom forward links 7 each having a distal end 16 adapted to be mounted to the aircraft structure and a proximal end 17 adapted to be mounted to the exterior of the rotary engine. The proximal ends 17 can include an elastomeric bushing having a high stiffness to resist deflection of the engine. Each forward link 7 has a reaction axis 11 passing through the roll axis 5 and passing through the proximal and distal ends 17, 16 of the forward link 7.

In a like manner, a rearward constraint is arranged in a plane orthogonal to the roll axis 5. The rearward constraint includes two non-parallel one-degree-of-freedom rearward links 8 each having a distal end 18 adapted to be mounted to the aircraft structure and a proximal end 19 adapted to be mounted to the exterior of the rotary engine. Each rearward link 8 has a reaction axis 11 passing through the roll axis 5 and passing through the proximal and distal ends 19, 18 of the rearward link 8. The proximal ends 19 can include an elastomeric bushing having a high stiffness to resist deflection of the engine.

In the example of FIG. 3, a separate one-degree-of-freedom axial link 13 serves as an axial constraint having a reaction axis parallel to the roll axis 5. In the example shown the axial link is oriented at an angle with a distal end 20 adapted for mounting to the aircraft structure and a proximal end 21 disposed on the roll axis 5. The proximal end 21 can include an elastomeric bushing having a high stiffness to resist axial deflection of the engine.

In FIG. 3, the roll constraint is shown as a pair of roll links 12 each with a trunnion 10. The distal end 22 of the roll link 12 is secured to the aircraft structure and exerts a moment reaction to restrain rotation about the roll axis 5. The trunnion 10 is mounted to the engine at a transverse distance "x" from the roll axis 5. The forward links 7, rearward links 8 and axial link 13 have an elastomeric bushing with a relatively high mounting stiffness, and the trunnion 10 on the roll link 12 has a relatively low mounting stiffness. Accordingly, the restraint of roll rotation about the roll axis is separate from other restraints and transmission of torque to the aircraft structure can be dampened with a lower stiffness.

Stated generally, the roll constraint comprises a one-degree-of-freedom roll link 12 having a distal end 22 adapted to be mounted to the aircraft structure and a proximal end with a trunnion 10 adapted to be mounted to the rotary engine. The roll link 12 has a reaction axis that is non-parallel to the roll axis 5 and spaced a transverse distance "x" from the roll axis 5. The roll constraint includes an opposing pair of the one-degree-of-freedom roll links 12 disposed on opposing sides of the roll axis 5 to decouple the torque roll degree of freedom.

In the examples of FIGS. 2 and 4, the axial restraint function of the axial link 13 and roll restraint function of the roll link 12 are combined in an A-frame 9. The combined axial constraint and the roll constraint is formed as an A-frame having two non-parallel one-degree-of-freedom central links 24. Each central link 24 has a distal end 25 adapted to be mounted to the aircraft structure. The distal ends 25 are spaced apart an axial distance "y" and the angular orientation provides for axial restraint. The proximal end of the central links 24 support the trunnion 10 which is adapted to be mounted to the rotary engine. The proximal ends of the central links 24 are joined at the transverse trunnion 10.

Figure 5:
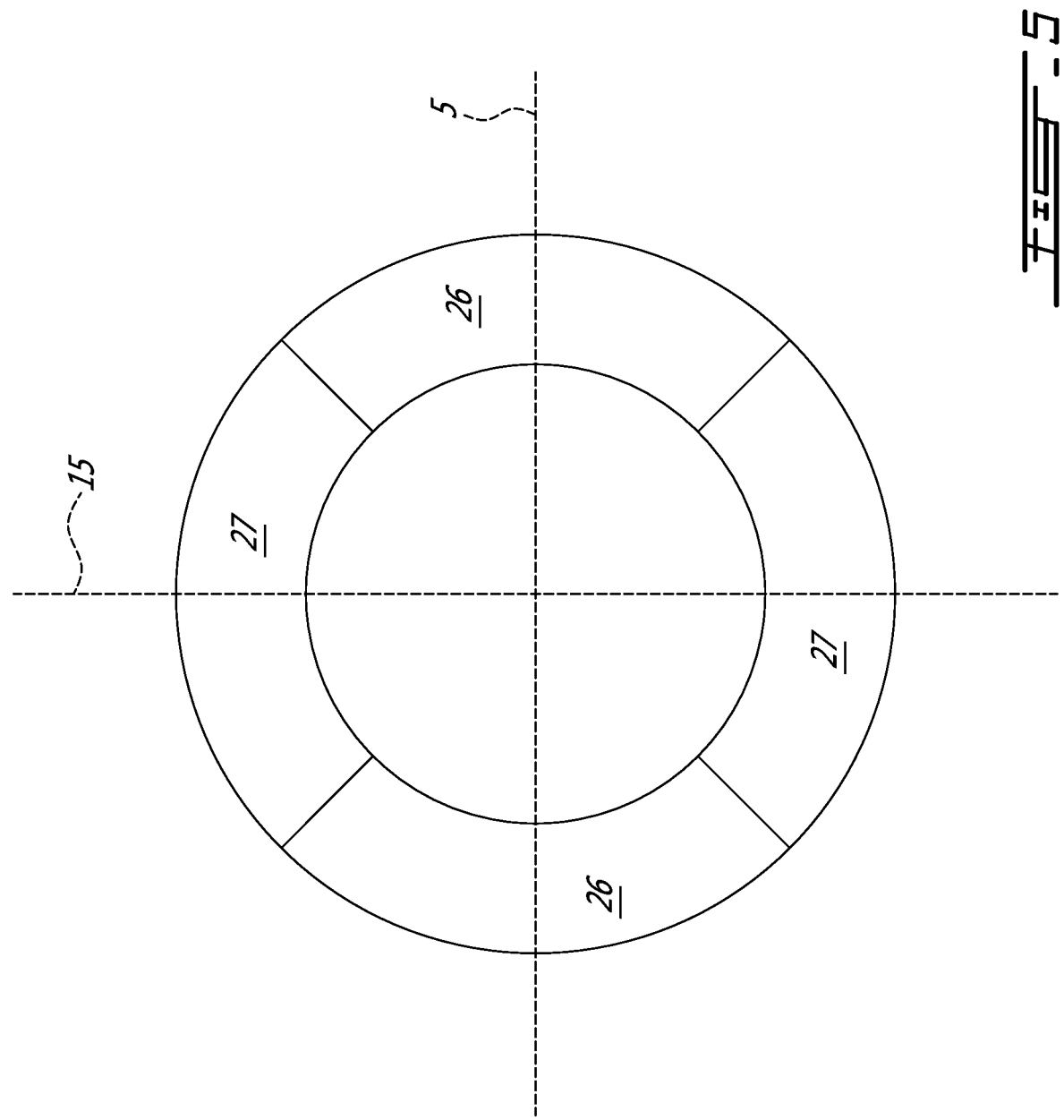
FIG. 5 is a section view along line 5-5 of FIG. 2 showing segmented elastomeric bushings for restraining roll rotation and axial translation.

With reference to FIG. 5, the transverse trunnion 10 restrains motion in the axial direction and in the roll rotation direction with an elastomeric bushing having an axial segment 26 defining the axial constraint with a high mounting stiffness and a radial segment 27 defining the roll constraint having a low mounting stiffness. An opposing pair of A-frames 9 is disposed on opposing sides of the roll axis 5.

In the examples shown, in FIGS. 2 and 3, the forward links 7 and the rearward links 8 are disposed on the same side of the roll axis 5 as the A-frames 9. However as indicated in FIG. 4, the orientation of the links 7, 8 and A-frame 9 could be rotated about the roll axis 5 for accommodating various engine mounting arrangements.

In accordance with at least one embodiment, there is provided an aircraft mount for a rotary engine having one degree of freedom links arranged to (i) decouple mounting degrees of freedom so that engine torque excitation will not cause displacements in any degree of freedom other than rotation about the roll axis, and (ii) restrain torque roll degree of freedom in a soft manner to isolate the aircraft structure from the engine torque excitation, and (iii) restrain all other degrees of freedom in a stiff manner to prevent high engine displacements.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft engine assembly comprising:
    a rotary engine having a roll axis, a pitch axis and a yaw axis extending through a center of gravity of the rotary engine,
    a first set of one-degree-of-freedom links mounted to a first side and a second side of the rotary engine, the first set of one-degree-of-freedom links having a distal end configured to be mounted to an aircraft and a proximal end mounted to the rotary engine, the first set of one-degree-of-freedom links positioned relative to the rotary engine to have respective reaction axes passing through the roll axis; and
    a second set of links having a distal end configured to be mounted to the aircraft and a proximal end mounted to the rotary engine, the second set of links positioned relative to the rotary engine to have respective reaction axes transversally spaced-apart from the roll axis wherein the first set of one-degree-of-freedom links has a first mounting stiffness, and the second set of links has a second mounting stiffness, wherein the second mounting stiffness is less than the first mounting stiffness.

2. The aircraft engine assembly according to claim 1, wherein the first set of one-degree-of-freedom links include a pair of forward links and a pair of rearward link and an axial constraint link having a reaction axis parallel to the roll axis; the forward links, the rearward links and the axial constraint link having a first mounting stiffness, the second set of links having a second mounting stiffness, wherein the second mounting stiffness is less than the first mounting stiffness.

3. The aircraft engine assembly according to claim 1 wherein the second set of links comprises: a pair of one-degree-of-freedom roll links, the roll links having reaction axes non-parallel to the roll axis and spaced a transverse distance X from the roll axis.

4. The aircraft engine assembly according to claim 3 wherein the pair of one-degree-of-freedom roll links is an opposing pair of said one-degree-of-freedom roll links disposed on opposing sides of the roll axis.

5. The aircraft engine assembly according to claim 2 wherein the second set of links comprises:
    a pair of A-frames each having two non-parallel one-degree-of-freedom links, each non-parallel one-degree-of-freedom link having a distal end configured to be mounted to the aircraft spaced apart an axial distance and a proximal end mounted to the rotary engine.

6. The aircraft engine assembly according to claim 5 wherein the proximal ends of the non-parallel one-degree-of-freedom links of the A-frame are joined at a trunnion.

7. The aircraft engine assembly according to claim 6 wherein the trunnion includes an axial segment defining the axial constraint having the first mounting stiffness and a radial segment defining the roll constraint having the second mounting stiffness.

8. The aircraft engine assembly according to claim 7 wherein the pair of A-frames is an opposing pair of said A-frames disposed on opposing sides of the roll axis.

9. A method of mounting a rotary engine to an aircraft structure, wherein the engine has a three orthogonal axes comprising: a roll axis; a pitch axis; and a yaw axis extending through a center of gravity of the rotary engine, the method comprising:
- mounting a forward portion of the engine to the aircraft structure with an opposing pair of non-parallel one-degree-of-freedom forward links having a reaction axis passing through the roll axis;
- mounting a rearward portion of the engine to the aircraft structure with an opposing pair of non-parallel one-degree-of-freedom rearward links having a reaction axis passing through the roll axis;
- axially constraining the engine with an axial constraint having a reaction axis parallel to the roll axis; and
- rotationally constraining the engine with a roll constraint having a moment reaction about the roll axis;
- wherein the forward links, rearward links and axial constraint have a first mounting stiffness, and the roll constraint has a second mounting stiffness, wherein the second mounting stiffness is less than the first mounting stiffness.

10. The method according to claim 9 wherein the engine is rotationally constrained about the roll axis using a one-degree-of-freedom roll link having a reaction axis non-parallel to the roll axis and spaced a transverse distance from the roll axis.

11. The method according to claim 10 wherein the engine is rotationally constrained about the roll axis and axially constrained parallel to the roll axis using a pair of opposing A-frames disposed on opposing sides of the roll axis.

12. The method according to claim 11, wherein the A-frames have two said one-degree-of-freedom roll links joined at a transverse trunnion.

13. The method according to claim 12, wherein the trunnion includes an axial segment defining the axial constraint having the first mounting stiffness and a radial segment defining the roll constraint having the second mounting stiffness.

14. An aircraft mount for a rotary engine comprising:
- an opposing pair of non-parallel one-degree-of-freedom forward links attached to a forward portion of the rotary engine and an opposing pair of non-parallel one-degree-of-freedom rearward links attached to a rearward portion of the rotary engine, the forward and rearward links having respective reaction axes passing through a torque roll axis of the rotary engine; and
- an A-frame link on each side of the engine between the forward and rearward links, the A-frame link oriented with a reaction axis transversely spaced apart from the torque roll axis, the reaction axis of the A-frame link being non-parallel to the torque roll axis and configured to restrain axial and roll movement;
- wherein the roll movement is restrained with a roll constraint of roll stiffness lower than an axial stiffness of an axial constraint and lower than a link stiffness of the non-parallel one-degree-of-freedom forward and rearward links.

15. The aircraft mount according to claim 14 wherein the A-frame link includes a trunnion mounted to the engine.

16. The aircraft mount according to claim 15 wherein the trunnion includes an axial segment defining the axial constraint having the axial stiffness and a radial segment defining the roll constraint having the roll stiffness.

* * * * *